Patented Nov. 21, 1950

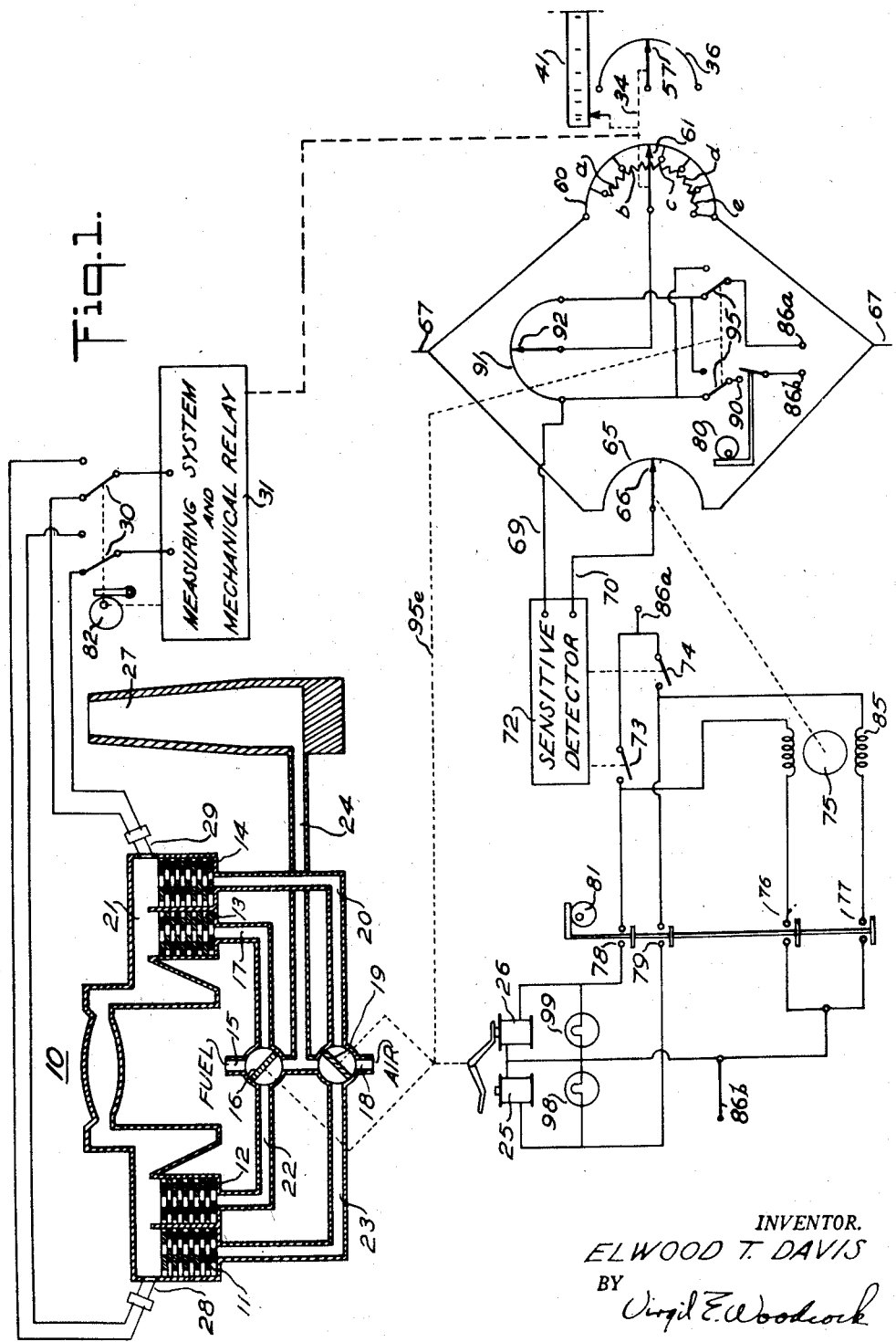

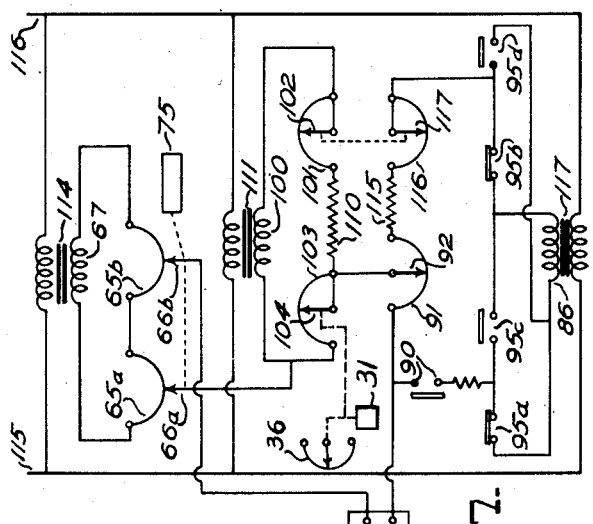
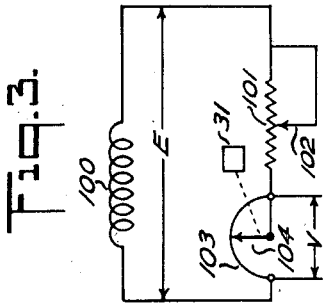
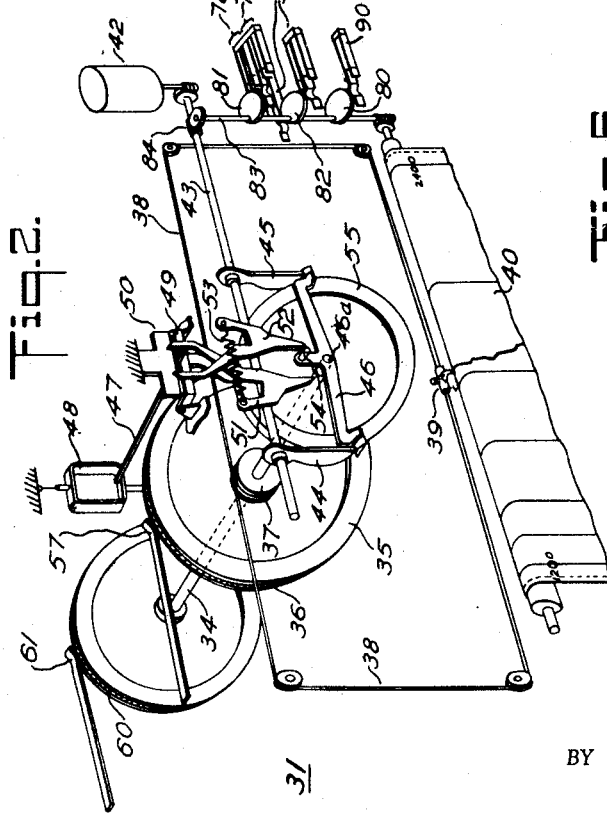
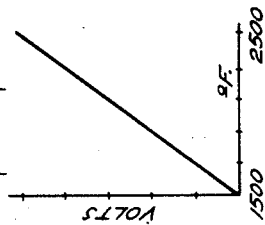
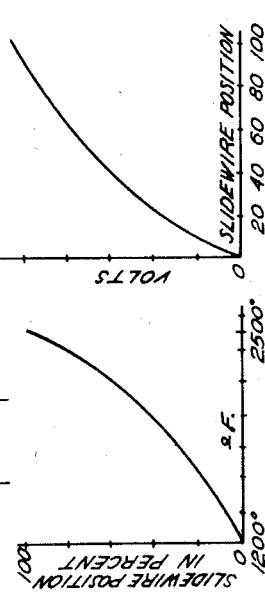
INVENTOR.
ELWOOD T. DAVIS
BY Virgil E. Woodcock
ATTORNEY.

2,531,200

UNITED STATES PATENT OFFICE 2,531,200

AUTOMATIC CONTROL SYSTEM USING NON-LINEAR RESPONSIVE ELEMENTS

Elwood T. Davis, Brookline, Pa., assignor to Leeds and Northrup Company, Philadelphia, Pa., a corporation of Pennsylvania Application October 10, 1944, Serial No. 558,098

12 Claims. (Cl. 236—15)

This invention relates to temperature control systems, more particularly to systems controlled by non-linear temperature responsive devices, and has for an object the provision of a simple and reliable system which responds to linear temperature changes notwithstanding the temperature-responsive devices are non-linear.

Open-hearth furnaces include a plurality of regenerative chambers in which are disposed fire-brick. Certain of the chambers serve for a time to absorb heat from the products of combustion, while other chambers and their fire-brick concurrently serve to preheat the combustion materials. The heating and heat-absorbing functions of the regenerative chambers are periodically reversed when a predetermined temperature difference exists therebetween.

Thermocouples located in selected positions in each checker-brick chamber have been used to measure the temperature of the chambers and to control the aforesaid operations. Thermocouples are, to a substantial degree, linear temperature-responsive devices, and with suitable compensating circuits the measuring and control circuits may be relatively simple. However, since the temperature of the gases as measured by a thermocouple is only an indirect measure of the temperature of the checker-brick, it is recognized that direct measurement of the temperature of the checker-brick itself is more desirable. If the temperature rises beyond the melting or softening temperature of the brick, the resultant changes due to deformation, slagging, or actual flow of the brick material, will greatly shorten the life of the checker-brick.

In carrying out the present invention in one form thereof, a measuring system is provided which compensates for the non-linearity of the output of radiation pyrometers. There is produced by the system a definite control, for a given temperature difference regardless of where that difference occurs over a relatively wide range of temperatures. More particularly, a primary measuring system is provided which measures the output of first one radiation pyrometer, and then the other radiation pyrometer. This primary system is arranged to unbalance a secondary system by an amount which is a linear function of the temperatures which activate the respective pyrometers. Whenever the secondary network is unbalanced in predetermined sense and to a predetermined degree corresponding with a predetermined temperature difference, a reversal in the operation of the regenerative checker-brick chambers is produced.

For a more complete understanding of the invention and for further objects and advantages thereof, reference should be had to the accompanying drawings, wherein:

Fig. 1 diagrammatically illustrates a system embodying the invention;

Fig. 2 diagrammatically illustrates in perspective certain parts of a mechanical relay or measuring device utilized in the primary system;

Fig. 3 is an elementary diagram of the essential elements of a modification of one feature of the system of Fig. 1;

Figs. 4, 5 and 6 are graphs explanatory of the manner in which the systems of Figs. 3 and 6 compensate for the non-linearity of radiation pyrometers; and Fig. 7 diagrammatically illustrates certain basic elements of Fig. 1 with the features of Fig. 3 incorporated therein.

Referring to the drawings, the invention in one form is shown as applied to a regenerative open-hearth furnace 10 provided with checker-brick chambers 11 and 12 on one side thereof, and checker-brick chambers 13 and 14 on the other side thereof. Fuel is supplied to the furnace through an inlet pipe 15 which flows by way of valve 16 and pipe 17 to the chamber 13. At the same time, combustion air is introduced through the inlet pipe 18 and flows by way of valve 19 and the pipe 20 to the chamber 14. The fuel and air are heated in the chambers 13 and 14 before combustion thereof in the zone 21. The preheating of both the combustion air and fuel is advantageous, as is well understood by those skilled in the art. The products of combustion flow across the open hearth of the furnace and exit by way of the checker-brick chambers 11 and 12. During the passage of the products of combustion through chambers 11 and 12, the checker-brick therein is elevated in temperature.

It will be observed these combustion gases are conducted by pipes 22 and 23, and through valves 16 and 19, to a common pipe or duct 24 which leads to a stack 27. The brickwork, or other heat absorbing material, disposed in the chambers 11 and 12 may be safely heated to a predetermined temperature. Fire-brick, for example, will fuse and slag if heated near or above the melting temperature thereof. In practice, it is desirable before such melting temperature is reached to reverse the operation of the furnace by throwing the valves 16 and 19 to their reverse positions. Any suitable mechanism may be provided for this purpose, such as a motor, or solenoids may be utilized as indicated at 25 and 26. With the valves in their reverse positions, the fuel and air flow to the open-hearth furnace by way of the pipes 22 and 23 and the regenerative chambers 12 and 11, respectively. The combustion products exit by way of the chambers 13 and 14 and the pipes 17 and 20. It is obvious that the foregoing cycle of operations is repeated in order to maintain a relatively high efficiency of operation for the furnace which means a substantial saving in fuel consumed.

In accordance with the present invention, radiation pyrometers 28 and 29 are mounted so as to view the checker work within the interior of chambers 11 and 14, respectively. By so mounting, or sighting, the radiation pyrometers 28 and 29 to receive the radiation from the associated chamber, particularly to view a typical portion thereof, the amount of heat or the heathead within the checker-brick chambers may be determined with a great deal more accuracy than with thermocouples. These radiation pyrometers are connected through a switch 30 to a primary measuring system and mechanical relay 31. The operation is such that the primary measuring system is first responsive to one and then to the other of the radiation pyrometers. As shown, the switch 30, in its left-hand position, connects the pyrometer 29 to the primary measuring system. After a predetermined period of time the cam 32 operates the switch 30 to its right-hand position to connect the pyrometer 28 to the measuring system 31. This cycle is repeated at a rate governed by the speed of a timing motor 42 of relay 31, shown in Fig. 2.

This primary measuring system may be of any suitable type in which the output or potential difference produced by each of the radiation pyrometers 28 and 29 is in turn balanced by a potential difference whose magnitude may be adjusted by means of a slidewire 36. The slidewire 36 is automatically positioned by a suitable mechanism or relay system of the type shown in Squibb Patent No. 1,935,732. The primary measuring system is preferably of the potentiometer type, as shown in Fig. 15 of said patent. It is characterized by a current of constant value being maintained in slidewire 36.

Referring to Fig. 2, a fractional part of the relay mechanism, as shown in said Squibb Patent No. 1,935,732, has been illustrated. The relay mechanism is provided with a shaft 34 which carries a disc 35 on which the aforesaid slidewire 36 of the primary measuring system is mounted. The shaft 34 also carries a driving pulley 37 for a violin string 38 which serves to drive a recording pen 39 across a strip chart 40. Though not illustrated in Fig. 2, a pointer is attached to the pen 39 or to the violin string 38, and is driven across a suitable indicating scale 41, as shown in Fig. 1. It may be observed the position of the pen 39, with respect to the calibrated chart 40, serves both as a recording and an indicating means.

The recorder chart 40 is normally driven at constant speed by any suitable source, such for example as a motor 42, which also serves to operate the recorder mechanism. This motor 42 drives, through the associated gearing, a shaft 43 on which is mounted a pair of cams 44 and 45 which cooperates with a clutch member 46, pivoted at 46a, coaxially with, but independently of, shaft 34. The clutch member 46 is angularly positioned in one direction or the other by means of a galvanometer pointer 47, and a feeler and clamping mechanism. For example, when an unbalance exists in the primary measuring system, the galvanometer 48 deflects its pointer 47 to the right or to the left, depending upon the direction of the unbalance; that is, whether the potential difference across the radiation pyrometer is greater or less than the potential difference controlled by the slidewire 36. Upon deflection of the pointer 47, a clamping bar 49 is moved upwardly by means of a cam (not shown) to press and to clamp the pointer 47 against a cooperating stop or clamping member 50. While the pointer is so held, a pair of feelers, 51 and 52, are released by a cam (not shown) rotating with the shaft 43 for movement toward one another by a biasing spring 53. The upper end of one or the other of the feelers is stopped by engagement with the end of the pointer 47. The other feeler continues its movement and the lower end thereof engages a pin 54 extending from the clutch arm 46, thereby to rotate the arm an amount depending upon the extent of the deflection of the pointer 47. The pointer 47 is then unclamped and responds to any further difference of potential which may exist as between a radiation pyrometer and the primary measuring network.

Subsequently in the cycle of the mechanism, the clutch member 46 is moved inwardly against a clutch disc 55. While the clutch members are so engaged, one or the other of the cams 44 and 45 engages the driving clutch arm 46 and restores it to its neutral position, and in doing so, rotates the disc 55 and the shaft 34 in one direction or the other. This, of course, produces rotation of the slidewire 36 and the driving pulley 37. The movement of the slidewire 36, relative to its cooperating contact 57, is in the direction to restore balance to the primary measuring network.

In this manner, the slidewire 36 is moved until balance is restored, with a corresponding movement of the driving pulley 37 to drive the pen 39 to a new position indicative of the change in potential difference produced by first one and then the other of the radiation pyrometers 28 and 29.

It will be observed the scale 41 is non-linear. It is a power scale which corresponds with the non-linear variation in the output of each radiation pyrometer. Because of the non-linearity, it is impossible to provide a system which directly responds to a desired temperature difference. In other words, the movement of the shaft 34 would greatly differ for the same temperature difference in the differing ranges of 1500° F.–2000° F.–2500° F., and 2500° F.–3000° F.

In accordance with the present invention, a second slidewire 60 is mounted on the shaft 34 and is adjustable thereby with reference to its cooperating contact 61. In Fig. 1, the slidewire 36 is diagrammatically illustrated, together with the scale 41, and the slidewire 60 is similarly illustrated with the broken line 34, indicating the mechanical connection therebetween. The slidewire 60, itself a wound or distributed resistor mounted on a supporting disc, has connected in parallel therewith a plurality of resistor sections indicated at $a$, $b$, $c$, $d$ and $e$. The resistors are connected in parallel with different sections of the slidewire resistor 60 and the relative values are so selected as to produce potential differences substantially directly proportional to the temperatures measured by one or the other of the radiation pyrometers. When the slidewire 36 is moved to a balancing position, the slidewire 60 is moved to a new position which unbalances a secondary measuring network, which comprises the slidewire 60 and a second slidewire resistor 65 having a cooperating contact 66. These two slidewires, as shown, in effect form a Wheatstone bridge to which alternating current is supplied from a suitable source indicated at 67.

Neglecting for the moment the additional circuits included in the circuit across the opposite juncture points of the bridge, the unbalance produced in the bridge is applied by conductors 69 and 70 to a "Sensitive Detector." This detector 72 may be a vacuum tube-relay combination which functions to close contacts 73 or 74, depending upon the sense of the unbalance.

When the detector 72 responds to an unbalance in one direction, it serves to close contacts 73 and when the unbalance is in the opposite direction, it serves to close contacts 74. These contacts 73 and 74 serve to control the operation of a motor 75 which adjusts the slidewire 65 relative to its contact 66 to restore balance in the secondary measuring circuit. The energization of the motor 75 is also under the control of cam-operated contacts 76 and 77. Additional cam-operated contacts 78 and 79 cooperate with contacts 73 and 74 to control the energization of the solenoids 26 and 25, respectively.

Now that the structural elements of the system have been explained, the manner in which they cooperate together will best be explained by a consideration of the operation as a whole. It will be assumed the regenerative furnace 10 has been in operation and that the valves 16 and 19 have just been operated to their illustrated positions so that the air and fuel passing through the chambers 13 and 14 are absorbing heat from the checker-brick. Accordingly, the product of combustion passing through the chambers 11 and 12 increase the temperature of the checker-brick therein. The primary measuring system 31 is, by switch 30, connected to the radiation pyrometer 29. After a few cycles of operation, of the mechanism of Fig. 2, the slidewires 36 and 60 are positioned in accordance with the temperature of the checker-brick in the chamber 14. The primary measuring system operates on a time cycle; that is, a measurement is completed in a predetermined period of time. Hence, the switches 76—79 may be operated by cam 81 mounted on a shaft 83, Fig. 2, which, by suitable gearing 84, is rotated at relatively slow speed.

After the measuring system, connected to pyrometer 29, has been balanced, the cam 81 closes the contacts 76 and 77. The detector 72, during the foregoing operations, has responded to the unbalance in the secondary measuring circuit. Since the temperature in the chamber 14 is presumably higher (because of the assumption of an earlier transfer from heat-absorbing to heating), the detector 72 closes the contacts 74 to complete an energizing circuit for the winding 85 of the motor 75 from a suitable source of alternating current indicated by the input terminals 86a and 86b. The motor 75 then rotates the slidewire 65 relative to its contact 66 in a direction to produce balance in the secondary network. After a time interval sufficient for balance to be obtained, the cam 81 opens the contacts 76 and 77. At this time another cam 82 operates the switch 30 to disconnect the pyrometer 29 from, and to connect the pyrometer 28 to, the primary measuring network.

After the mechanical relay 31 produces balance in the primary network, with pyrometer 28 connected thereto, the cam 80 operates to close the switch 90 to connect the alternating current source 86 in series with a slidewire 91 and the detector 72. The slidewire 91 is manually adjusted relative to its cooperating contact 92 so as to introduce a potential difference in the secondary measuring network of a magnitude which will be equal to that produced by the movement of slidewire 60 due to the difference in the temperatures, which is not to be exceeded, between the chambers 11 and 14. For example, it will be assumed this temperature difference is 700° F. The potential introduced by slidewire 91 compensates for this temperature difference. Accordingly, the detector 72 will respond only if the temperature observed by pyrometer 28 differs by other than 700° F. from that of pyrometer 29. Depending upon the sense of the departure, whether above or below 700° F., the detector 72 will operate to close contacts 73 or 74. Shortly after closure of the switch 90, the cam 81 operates to close the contacts 78 and 79, preparatory to closure of contacts 73 or 74 by detector 72.

Since it has been assumed that a transfer of operations has just been made, it will be understood the temperatures of the chambers 13 and 14 are materially higher than the temperatures of the chambers 11 and 12. Nevertheless, the voltage introduced from the source 86a, 86b and by the slidewire 91 is in the direction, and has the proper polarity to modify the operation of the Wheatstone bridge so as to require within the chamber 11 a temperature 700° F. higher than that in the chamber 14. Consequently, upon the initial reversal of operations the temperature of chamber 14 is no more than 700° higher than that of the chamber 11. Hence, the detector 72 responds to this unbalance to close its contacts 73. This completes an energizing circuit through the contacts 78 for the coil 26 of the valve-operating mechanism. Nothing happens, however, because the valves have already been operated by the coil or solenoid 26 to their illustrated positions. The cam 81 then opens contacts 78 and 79. The cam 80 opens switch 90 and the cams 81 and 82 serve as before to operate switch 30 to its illustrated position and to close contacts 76 and 77.

The foregoing operations are repeated while the temperatures within the chambers 13 and 14 decrease and the temperatures of chambers 11 and 12 increase. No different operation occurs until the temperature of chamber 11 exceeds by a predetermined temperature, for example 700° F., the temperature of the chamber 14. When this occurs the corrective voltage introduced into the Wheatstone bridge network is insufficient or is overcome by the unbalance introduced by the slidewire 60. Hence, the detector 72 operates to close the contacts 74. Consequently, the energizing circuit may be completed from the source 86a, 86b through contacts 74 and 79 for the solenoid 25, which thereupon functions to operate the valves 16 and 19 to their opposite positions.

The regenerative furnace then operates with introduction of air and fuel through the chambers 11 and 12, with the combustion gases leaving the furnace by way of chambers 13 and 14. At the same time, the potential difference introduced into the secondary network is reversed in polarity by means of a double-pole double-throw switch 95, mechanically operated, as indicated by the broken line 95e, by the valve-operating solenoids 25 and 26. The reversal of the polarity requires the temperature difference to be in the opposite direction, that is, contacts 74 will not close until the temperature of the chamber 14 exceeds by a predetermined amount, that is, 700° F., the temperature of the chamber 11.

The foregoing cycle is repeated accurately to control the operation of the regenerative furnace 10 and to increase its overall operating efficiency.

By changing the values of the resistors a to e inclusive (Fig. 1), the resistance of the slidewire 60 may be tapered or otherwise varied. Its resistance value may be varied in manner more than to offset the non-linearity of the radiation pyrometers. If this is done, the temperature difference required for reversal of operation of the regenerative furnace 10 is increased as the temperature rises. In some applications this feature is advantageous since a constant temperature difference control may not produce the desired rapidity of reversals at a selected low temperature range and reversals may occur with too great a frequency at a higher selected range of operating temperatures. By suitable adjustment of the characteristics of the slidewire 60, the frequency of reversals may be made more or less constant over a relatively wide range of selected operating temperatures. These resistance values may also be selected to produce under-compensation as well as over-compensation or exact compensation.

While the invention is applicable to radiation pyrometers of any character, those available on the market from applicant's employer under the trade name of "Rayotube" have been found quite satisfactory.

By manually adjusting the slidewire 91, any desired temperature difference may be required to produce reversal in the operation of the regenerative furnace 10. For convenient manual selection of the desired operation, the slidewire 91 may be calibrated in terms of temperature difference.

Associated with the reversing solenoids 25 and 26 are signal lamps 98 and 99 which serve to indicate when and which transfer-operation is taking place. Obviously, the actual operation of the valves 16 and 19 may be effected manually in response to the signal arising by energization of one or the other of such signal lamps. The valves may then be operated directly by an operator, or by a mechanism manually controlled by him.

While the invention has been described in connection with a regenerative furnace, it is to be understod the invention may be applied to all measuring and control systems where a linear or near-linear response is desired from non-linear condition-responsive devices.

Instead of the characteristic-changing resistors a—e associated with the slidewire 60, the same results may be obtained by an arrangement which is itself believed to be new and which may be readily applied to many systems, including the one above described. The circuit arrangement is shown in its elementary form in Fig. 3. The winding 100, the secondary of a transformer, represents a source of constant voltage E which is applied across a resistor 101 and a slidewire 103. The resistor 101 has a manually adjustable contact 102 for short-circuiting a portion of resistor 101. The slidewire 103 is adjusted relative to its contact 104 by the primary mechanical relay 31. The relative adjustment of this slidewire also short-circuits, or removes, from the series-circuit including resistor 101, a part of the slidewire. The voltage V introduced into the network has a magnitude determined by the following relations:

$$V = \frac{ER103}{R103+R101}$$

where V and E are in volts, and R103 and R101 represent the resistances in ohms of resistors 103 and 101. Preferably, resistor 101 is arranged so that some of its resistance will always be effective in the series-circuit.

When slidewire 103 is excluded from the circuit, R103 is equal to zero. Hence, for any value of R101 the voltage V will be zero. If resistor 101 could be excluded from the circuit, R101 would be zero and V would then equal E for any value of R103 other than zero. Between these limits, V will vary non-linearly, depending upon the relative setting or position of the slidewire 103 with respect to its contacts 104. Since the adjustment of slidewire 103 varies the resistance of the circuit including resistor 101, both the resistance and the current flowing through that circuit change. Hence, the change in the voltage V varies as a function of the resultant change in the current and of the resistance. The variation in value of voltage V is not linear. It may be made to vary as a close approximation of the fourth root and therefore may compensate or correct for the non-linear approximate fourth power variation in the response of the radiation pyrometers 28 and 29.

In one embodiment of the invention, the slidewire 103 had a resistance of 172 ohms while the resistor 101 had a setting for a resistance of the remaining part of the series-circuit of 155 ohms.

As already explained, the setting or position of slidewire 36 varies non-linearly with temperature. This is graphically shown in Fig. 4 where the position of the slidewire 36 in per cent of its range of movement has been plotted as ordinates, against temperature as abscissae. Since slidewires 36 and 103 are both simultaneously adjusted by relay 31, the positions of this slidewire 103 in per cent of its range have been plotted in Fig. 5 as abscissae against the voltage introduced into the secondary measuring network for positions of the slidewire 103 as set by the relay 31, as ordinates. The resultant curve of Fig. 5 is generally the reverse of that of Fig. 4. The curve of Fig. 4 varies approximately as the fourth power of the temperature while the curve of Fig. 5 shows the slidewire voltage varies approximately as the fourth root of the slidewire position.

In Fig. 6, the voltage introduced into the secondary network has been plotted as ordinates against the temperature to which a pyrometer is subjected, as abscissae. The resultant curve throughout the range of temperatures, 1500° F. to 2500° F., is a straight line, thus graphically illustrating the manner in which a non-linear variation in the response of a radiation pyrometer, or other device, may be converted into a voltage which varies linearly with the measured temperature.

As shown in Fig. 3, the manual adjustment of resistance 101 permits ready adjustment of the characteristics of the network of Fig. 3. By increasing or decreasing the value of resistance 101, either an overcorrection or an undercorrection for the non-linear response of the pyrometers may be obtained. Such abnormal corrections are in some applications advantageous. Without the present invention, specially designed and constructed slidewires would be necessary for every change in the characteristics, whereas in accordance with the invention, great flexibility in operation is at all times made available.

The principal features of a commercial embodiment of the invention have been illustrated in Fig. 7. Parts corresponding with those of Figs. 1–3 bear the same reference characters.

In Fig. 7, the slidewire 60 of Fig. 1 has been replaced by an arrangement the equivalent of Fig. 3. Thus it will be seen the mechanical relay 31 serves relatively to adjust slidewire 103 and its contact 104. This slidewire has a resistance of 172 ohms with a fixed resistor 110 of 50 ohms connected in series therewith, and in series with a manually adjustable slidewire 101 having a range of 140 ohms. For a straight-line variation with temperature, this slidewire 101 will be set for a value of 105 ohms. With this setting, the resistance of the series-circuit, exclusive of slidewire 103, is 155 ohms, the same as for Fig. 3. This series-resistor combination is connected across the secondary winding 100 of a transformer 111. The balancing slidewires 65a and 65b are adjusted by the motor 75 to adjust them relative to their contacts 66a and 66b, as already explained in connection with the system of Fig. 1. The division of slidewire 65 into the two slidewires 65a and 65b is a matter of convenience of design. It will be understood the two slidewires jointly decrease or increase the resistance in the network under the control of motor 75, as already described in connection with Fig. 1.

The source of supply 67 in Fig. 7 is the secondary winding of transformer 114 whose primary winding is connected across alternating current supply lines 115 and 116. This source of supply also is connected to the primary winding of transformer 111 and to the primary winding of transformer 117 whose secondary winding 86 serves to introduce the temperature-difference determining voltage into the network. In Fig. 7, the switch 95 is shown with contacts 95a and 95b closed, corresponding with the first operation assumed in the description of Fig. 1. When switch 90 is closed, this compensating voltage prevents reversal of the furnace until the temperature difference, in sense and magnitude, between chambers 11 and 14 has a predetermined value.

This temperature difference is predetermined by the setting of slidewire 91 with respect to its contact 92, as already explained. However, there is included in series with slidewire 91, of 164 ohms, a fixed resistor 115, of 75 ohms, and a manually adjustable slidewire 116, of 140 ohms. The slidewire 116 is preferably adjusted relative to its contact 117, concurrently with adjustment of characteristic-determining slidewire 101. Hence, when the slidewire 101 is adjusted relative to its contact 102 to overcorrect or undercorrect for non-linearity, the slidewire 116 is adjusted to maintain operation with the same temperature difference as predetermined by the setting of slidewire 91.

In both Figs. 1 and 7, the primary measuring circuit and its relay 31 is used to adjust a slidewire (60, Fig. 1; 103, Fig. 7) in a second balanceable circuit which compensates in the circuit for the non-linearity of movement produced by the non-linearity of the condition-responsive devices or radiation pyrometers. It is to be understood the several features, particularly the system of Fig. 3, may be incorporated in the primary system or otherwise utilized to convert non-linear movement of the slidewire into linear changes of voltage in the measuring system or network proper. Conversely, linear adjustments or equal changes in the setting of slidewire 103 will produce non-linear changes of voltage which, for certain applications, will be found useful.

While preferred embodiments of the invention have been described, it will be understood that further modifications may be made without departing from the spirit and scope of the invention as set forth in the appended claims.

What is claimed is:

1. In combination, a condition-responsive means whose output varies non-linearly with respect to changes in the magnitude of a condition, a balanceable network including a variable impedance, circuit connections across said impedance for deriving from said network an output voltage determined jointly by the magnitude of said variable impedance and by a current whose magnitude is controlled by said impedance, a second network traversed by a constant current and including a variable impedance, and means for concurrently balancing the output of one network against the output of said condition-responsive means and for varying the impedance in the other of said networks whereby the output of said other network varies linearly with respect to changes in the magnitude of said condition.

2. In a temperature-difference control system, the combination of radiation pyrometers respectively responsive to different temperatures, each of said pyrometers having an output which varies non-linearly with temperature, a balanceable network, means for connecting first one and then the other of said pyrometers to said balanceable network, means for balancing said network first while one and then while the other of said pyrometers is connected thereto, a second balanceable network including means for unbalancing it linearly with respect to temperature in contrast with the non-linear unbalancing of said first network by said pyrometers, means operable concurrently with the balancing of said first network to operate said unbalancing means of said second network, and a second means for balancing said second network.

3. In a temperature-difference control system, the combination of radiation pyrometers respectively responsive to differing temperatures, each of said pyrometers having an output which varies non-linearly with temperature, a balanceable network, means for connecting first one and then the other of said pyrometers to said balanceable network, means for balancing said network first while one and then while the other of said pyrometers is connected thereto, a second balanceable network including means for unbalancing it linearly with respect to temperature in contrast with the non-linear unbalancing of said first network by said pyrometer, means operable concurrently with the balancing of said first network to operate said unbalancing means of said second network, a second means in said second network for balancing the same, means for introducing into said second network a voltage which in polarity and magnitude requires a predetermined temperature difference before unbalance of said second network may occur in one direction, and temperature-controlling means operable in response to unbalance of said second network in said one direction.

4. In a temperature-difference control system, the combination of radiation pyrometers each subjected to different temperatures, a measuring system, means for connecting said pyrometers in succession to said measuring system, said measuring system including a variable impedance for producing balance thereof, the movement of said variable impedance being non-linear with respect to changes of said temperatures, means for controlling the relative magnitudes of said temperatures, a second balanceable network having a second impedance operable concurrently with said first-named impedance for producing a linear unbalance, with respect to said temperatures, of said second network, means associated with said second network for introducing a voltage to establish a predetermined temperature difference before unbalance thereof may occur in one direction, and means responsive to unbalance in said one direction for operating said temperature-controlling means in the direction to limit said temperature difference between said temperatures.

5. In a temperature-difference control system, the combination of radiation pyrometers each subjected to different temperatures, a measuring system, means for connecting said pyrometers in succession to said measuring system, said measuring system including a variable impedance for producing balance thereof, the movement of said variable impedance being non-linear with respect to changes of said temperatures, means for limiting the difference in magnitudes of said temperatures, a second balanceable network having a second impedance operable concurrently with said first-named impedance for producing unbalance in said second network, means for producing a linear unbalance, with respect to temperature, of said second network upon non-linear movement of said second impedance, means associated with said second network for introducing a voltage to establish a predetermined temperature difference before unbalance thereof may occur in one direction, and means responsive to unbalance in said one direction for operating said temperature-limiting means to limit said difference between said temperatures.

6. The combination with a source of potential, of at least a pair of resistors connected in series-circuit relation across said source, both of said resistors being adjustable to change the resistance of, and the current flowing in, said series circuit, conductors connected across a first of said resistors for deriving from that resistor a voltage whose magnitude is dependent upon both the current change and its resistance change resulting from adjustment thereof, said resistors having resistance values which for equal resistance changes of said first of said adjustable resistors vary said voltage substantially in accordance with a predetermined root of said changes, a secondary measuring network connected to said conductors for application thereto of said derived voltage, a primary balanceable network responsive to a voltage which varies in accordance with a power law, means responsive to unbalance of said primary network for adjusting said one of said adjustable resistors, and manual means for adjusting said other resistor to vary said root of said voltage, to produce any desired compensation for the power law voltage variation in said other network.

7. The combination with means for changing the relative magnitudes of temperatures, of a temperature-difference control system comprising a radiation pyrometer responsive to each of said temperatures, each said pyrometer having an output which varies non-linearly with temperature, a primary measuring network including a variable impedance operable to a position indicative of the output of a pyrometer to balance said network, means for connecting said pyrometers in succession to said primary network, a second balanceable network including at least a second and a third adjustable impedance, means for adjusting one of said second and third impedances concurrently with adjustment of said impedance of said primary network to unbalance said second network, means operable when one of said pyrometers is connected to said primary network for balancing said secondary network and inoperative to balance said secondary network when the other pyrometer is connected to said primary network, means operable only when said other pyrometer is connected to said primary network for changing the balance of said secondary network by a predetermined amount and in predetermined sense, and means responsive to a resultant unbalance of said secondary network in a predetermined sense for controlling the operation of said temperature-changing means.

8. The combination with a regenerative furnace having a plurality of regenerative chambers respectively containing heat absorbers and means for selectively controlling the flow of combustion materials through said chambers, of radiation pyrometers disposed in view of the interiors of said chambers and responsive non-linearly to the temperatures developed therein, means for producing from said non-linear responses of said pyrometers a temperature-difference response corrected for said non-linearity comprising a measuring circuit including a variable resistor, means for adjusting said variable resistor in response to the difference between said non-linear responses, a source of potential, a second resistor, means connecting said second resistor and said variable resistor in series-circuit relation across said source, said variable resistor being adjustable to change the resistance of, and the current flowing in, said series circuit, an electrical circuit connected across said variable resistor for applying to said measuring circuit a voltage derived from said series circuit, said voltage having a magnitude dependent upon both the current change and the resistance change resulting from said adjustment of said resistor, and means responsive to a predetermined unbalance of said measuring circuit for controlling operation of said selective means.

9. The combination with a regenerative furnace having a plurality of regenerative chambers respectively containing heat absorbers and means for selectively controlling the flow of combustion materials through said chambers, of radiation pyrometers disposed in view of the interiors of said chambers and responsive to the temperatures developed therein in accordance with a power law thereof, means for producing from said power law responses of said pyrometers a temperature-difference response corrected for said power law responses comprising a measuring circuit including a variable resistor, means for adjusting said variable resistor in response to the difference between said power law responses, a source of potential, a second resistor, means connecting said second resistor and said variable resistor in series-circuit relation across said source, said adjustable resistor being adjustable to change the resistance of, and the current flowing in, said series circuit, an electrical circuit connected across said variable resistor for applying to said measuring circuit a voltage derived from said adjustable resistor, said voltage having a magnitude dependent upon both the current change and the resistance change resulting from said adjustment of said resistor, said resistors having values which for equal movements of said adjustable resistor vary said voltage substantially as a corresponding root of said power law changes thereby to correct for said power law responses of said pyrometers, and means responsive to a predetermined unbalance of said measuring circuit for controlling operations of said selective means.

10. Means for controlling temperature in response to the difference between two temperatures by temperature-responsive devices whose outputs vary non-linearly with temperature, comprising a measuring network, movable means for balancing said network first in response to one of said devices and then in response to the other of said devices, a second network, means operable with said movable means for linearly unbalancing said second network in accordance with temperature, and control means operable from one controlling position to another in response to a predetermined unbalance in said second network corresponding to a predetermined difference between said two temperatures.

11. The combination with a condition-responsive device having with respect to the condition under measurement a non-linear output characteristic, of a source of potential, at least a pair of resistors connected in series-circuit relation across said source, means operable in accordance with said non-linear output of said device for adjusting at least one of said resistors to change the resistance of, and the current flowing in, said series-circuit for development across said adjustable resistor of a voltage whose magnitude varies non-linearly for equal changes of resistance values of said adjustable resistor and whose magnitude varies linearly with respect to changes of the condition under measurement, a circuit connection across said adjustable resistor for deriving from said series-circuit said voltage, and a balanceable network including said circuit connection for development in said network of said voltage which varies linearly with respect to change of the condition under measurement.

12. The combination with a condition-responsive device having with respect to the condition under measurement a non-linear output characteristic, of a source of potential, a pair of resistors connected in series-circuit relation across said source, means operable in accordance with said non-linear output of said device for adjusting at least one of said resistors to change the resistance of, and the current flowing in, said series-circuit for development across said adjustable resistor of a voltage which varies non-linearly with respect to equal changes in the resistance values of said adjustable resistor and linearly with respect to change of the condition under measurement, said resistors having values which for equal resistor adjustments vary said voltage substantially as a root of the magnitude of said resistor adjustments, a circuit connection across said adjustable resistor, and a balanceable network including said circuit connection for development in said network of said voltage which varies approximately linearly with respect to change of the condition under measurement.

ELWOOD T. DAVIS.

REFERENCES CITED

The following references are of record in the file of this patent:

UNITED STATES PATENTS

| Number | Name | Date |
|---|---|---|
| 950,513 | Northrup | Mar. 1, 1910 |
| 1,162,475 | Gibson | Nov. 30, 1915 |
| 1,400,077 | Keith | Dec. 13, 1921 |
| 1,560,951 | Thompson | Nov. 10, 1925 |
| 1,582,060 | Lovejoy | Apr. 27, 1926 |
| 1,655,276 | Lichtscheindl | Jan. 3, 1928 |
| 1,677,691 | Smith | July 17, 1928 |
| 1,683,809 | Schofield | Sept. 11, 1928 |
| 1,760,204 | Mittendorf | May 27, 1930 |
| 1,931,799 | Hunter | Oct. 24, 1933 |
| 2,098,574 | Doyle | Nov. 9, 1937 |
| 2,275,317 | Ryder | Mar. 3, 1942 |
| 2,329,841 | Keinath | Sept. 21, 1943 |
| 2,356,269 | Potter | Aug. 22, 1944 |

FOREIGN PATENTS

| Number | Country | Date |
|---|---|---|
| 563,714 | Germany | Nov. 9, 1932 |

Certificate of Correction

Patent No. 2,531,200 November 21, 1950

ELWOOD T. DAVIS

It is hereby certified that error appears in the printed specification of the above numbered patent requiring correction as follows:

Column 3, line 70, for the word "cooperates" read *cooperate*; column 4, line 55, for "F.–2000° F.–2500° F.," read *F.-2000° F., 2000° F.-2500° F.,*; line 67, for "resisors" read *resistors*; column 8, line 19, for "contacts" read *contact*;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*